United States Patent [19]

Scheffels et al.

[11] 4,164,641

[45] Aug. 14, 1979

[54] METHOD AND APPARATUS FOR ENERGY BEAM WELDING WITH FILLING MATERIAL

[75] Inventors: Wilhelm Scheffels, Puchheim; Johannes Koy, Germering; Franz Rappold; Walther Hiller, both of Munich; Karl H. Steigerwald, Starnberg, all of Fed. Rep. of Germany

[73] Assignee: Steigerwald Strahltechnik GmbH, Munich, Fed. Rep. of Germany

[21] Appl. No.: 821,476

[22] Filed: Aug. 3, 1977

[30] Foreign Application Priority Data

Aug. 3, 1976 [DE] Fed. Rep. of Germany ....... 2634833

[51] Int. Cl.² .............................................. B23K 9/00
[52] U.S. Cl. .............................................. 219/121 EM
[58] Field of Search ..... 219/121 L, 121 LM, 121 EB, 219/121 EM

[56] References Cited

U.S. PATENT DOCUMENTS

| | | | |
|---|---|---|---|
| 3,165,619 | 1/1965 | Cohen | 318/675 X |
| 3,417,223 | 12/1968 | Steigerwald | 219/121 EM |
| 3,448,240 | 6/1969 | Steigerwald | 219/121 EM |

FOREIGN PATENT DOCUMENTS 2204187  8/1973  Fed. Rep. of Germany .
2423577  11/1974  Fed. Rep. of Germany .
2093322  1/1972  France .
2128114  10/1972  France .

Primary Examiner—J. V. Truhe
Assistant Examiner—Fred E. Bell
Attorney, Agent, or Firm—Brumbaugh, Graves, Donohue & Raymond

[57] ABSTRACT

A deep penetration weld join is produced in an energy beam welding method where the energy beam, as for example, an electron beam, is directed into the join to produce a welding zone containing molten material, and moved along the join relative to the parts of the work. Additional material is introduced into the welding zone to fill a gap and/or to influence the metallurgical composition of the weld zone. By introducing the material into the melt at an acute angle to the beam axis and at a point spaced alongside the beam axis, the additive material penetrates deeply into the molten material. The additive material may be preheated prior to its introduction to the welding zone.

13 Claims, 5 Drawing Figures

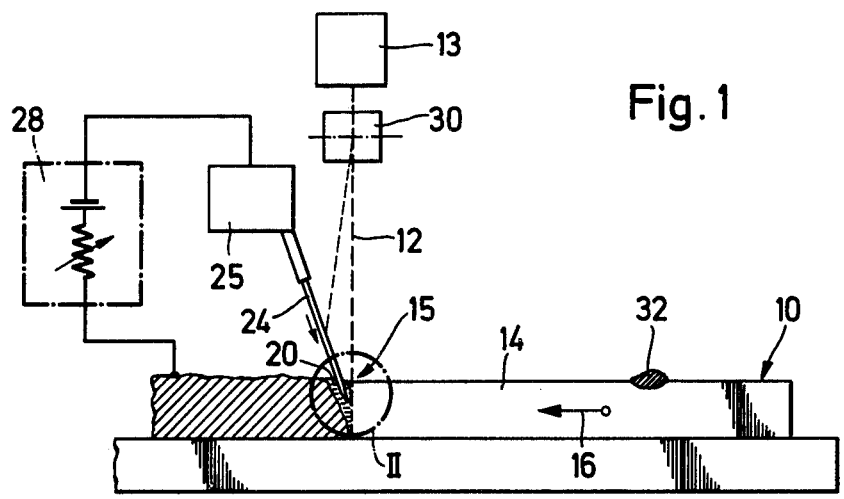
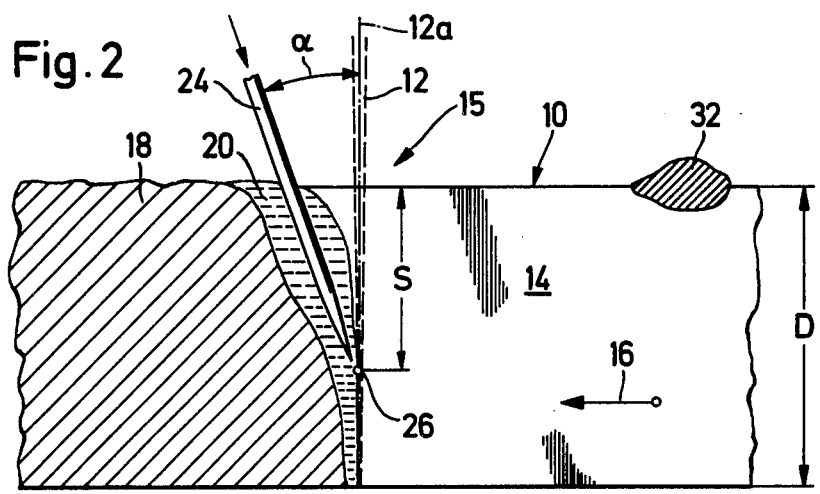
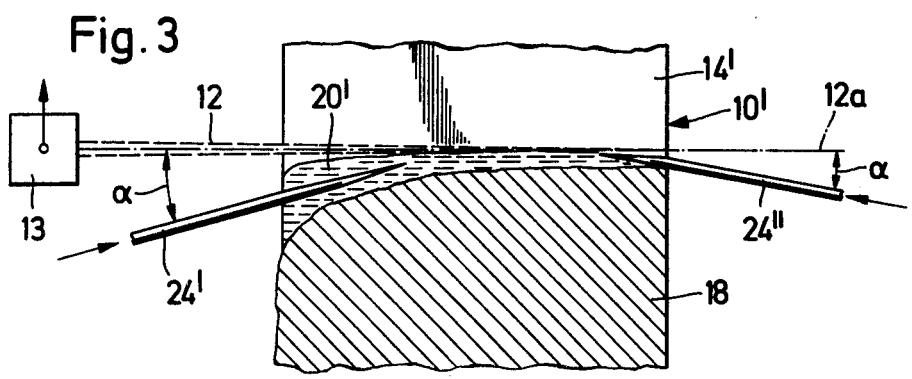

METHOD AND APPARATUS FOR ENERGY BEAM WELDING WITH FILLING MATERIAL

The present invention relates to a method of energy beam welding, preferably electron beam welding, in which an additive material is introduced into a welding zone produced by the beam and containing molten material in order to properly fill a gap between two parts to be welded together and/or incorporate certain alloy or additive elements with said molten material. In particular, the invention relates to such a method for welding parts of thickness over 5 mm, in particular over 20 mm.

Electron beam welding with supply of additive material to fill a gap between two parts to be welded together is known for example from U.S. Pat. No. 3,165,619. Here the additive material is supplied from the open side of the join, that is, "ahead of" the beam, so that the electron beam impinges upon it and fuses it, and the molten material flows into the welding zone. In this way the gap is filled and a dense seam is produced.

Besides filling a gap, the additive material may serve to introduce certain alloy components into the weld, or influence the weld metallurgically.

The known methods of energy beam, in particular electron beam welding, have proved successful in welding comparatively thin parts, but they leave something to be desired in welding comparatively thick parts, such as steel plates of thicknesses over 20 mm, in particular over 40 or 50 mm. Thus in the case of heavy thicknesses, a thorough blending of the molten additive material with the molten material of the part is not assured when the additive material is supplied in known manner. A thorough filling of the gap is likewise difficult to achieve in the case of comparatively thick parts. In the case of heavy parts, it is also usually necessary for reasons of economy to allow comparatively large tolerances on shape and/or dimensions, so that the join to be welded will be correspondingly irregular. For reasons of fabrication, the parts to be welded together may be temporarily connected ("tacked") together, generally at intervals, along the join. Such small "tack" welds at the top of the seam interfere with the supply of additive material.

The object of the present invention is to disclose a method of energy beam welding that will provide perfect seams even in welding very thick parts. Specifically, this object may consist in filling a gap that may be present at the join and/or controlling the chemical composition of the material of the weld in such a way as to avoid flaws due to the material, particularly in welds of great depth.

This is accomplished by a method of welding together two parts separated by a join by means of an energy beam, in particular an electron beam, extending along a beam axis, the energy beam being directed into the join and moved along the join relative to the parts to produce a welding zone containing molten material, and the additive material being introduced continuously or discontinuously into the welding zone to fill a gap situated at the join, in that, according to the invention, the additive material enters at an acute angle to the axis of the beam and alongside it into the region of greatest thickness of the molten zone surrounding the vapor capillary produced by the energy beam.

The axis of the beam is its centerline when the beam is not deflected, and the mid-position of the beam centerline when the beam oscillates across the join.

The acute angle may conveniently be at most 40°, preferably at most 30° or 25°; angles under 20° have given especially good results. Preferably, the elongated body of filling material should not be completely fused short of a depth amounting to at least an eighth or more of the depth of the work.

The additive material may be introduced into the melt either on the side of the parts where the beam enters or on the opposed side, and additive material may alternatively introduced from both sides.

Preferably, the additive material is introduced into the melt on that portion of the welding zone which is opposed to the as yet open portion of the join, that is, in terms of the direction of relative motion between beam and parts, "behind" the beam. If desired, however, some departure may be made from this preferred orientation if the welding zone is asymmetrical with respect to the plane of the seam, as may for example be the case in welding a horizontal join.

The additive material may be brought into the weld in the solid state continuously, for example in the form of wire or ribbon, or discontinuously, for example in the form of single particles, preferably of like shape, or alternatively in the liquid state, in the form of a thin stream of molten material. Compared to the feed velocity of solid additive material introduced continuously, the feed velocity of discontinuously introduced solid as well as of liquid additive material will be very high; in the latter two cases, the introduction of the additive material may be referred to as injection.

In the use of continuously introduced solid additive material, the fact that a portion of the additive material, in the form of wire or ribbon for example, penetrates deep into the zone of fusion at the weld while still in the solid state, ensures that the additive material will blend thoroughly with the molten material of the work and will reach into the deep portion of the weld as well. Also, there is less danger that bits of the solid additive material may be detached prematurely and become imbedded unmelted in the sometimes very rapidly cooling molten material.

The additive material continuously supplied, preferably in the form of wire or ribbon, may be introduced so that it is fused exclusively by the heat transferred to it from the molten material, and not by direct action of the energy beam. Preferably at least 40%, in particular more than 50%, for example 70% or more of the additive material has been fused by the time any as yet solid residue reaches the region of the welding zone on which the energy beam impinges. The region in which compact additive material enters the molten material is preferably located wholly or at least in part outside the region of molten material on which the beam impinges, and the beam is to fuse comparatively little (for example less than 50%) of the additive material, or none, outside of the melt.

In the use of discontinuously introduced solid additive material, the high velocity of the particles ensures that they will be injected deep into the zone of fusion of the weld and blend thoroughly with the fused material of the work. By varying the injection interval, the amount of additive material supplied may be adapted to requirements from time to time. In the use of liquid additive material, favorable conditions for thorough blending of additive material and fused stock are provided beforehand. The high velocity of the fused jet also substantially aids the blending process.

If the additive material is introduced into the melt "behind" the beam, tack welds temporarily connecting the two parts to be welded together clearly cannot interfere, having already been fused by the energy beam wherever the body of filling material is being introduced into the welding zone.

In the following, the invention will be further illustrated with reference to the drawing, with mention of further aspects and features of the invention.

In the drawing,

FIG. 1 shows a sectional view in the median plane of a join between two parts being welded together by means of an electron beam welding machine according to the invention, using continuously introduced additive material;

FIG. 2 shows an enlarged sectional view of a portion of FIG. 1;

FIG. 3 shows a sectional view similar to FIG. 2, but for the case of welding a perpendicular join by means of an electron beam moving from below upward relative to the parts of the work;

Figure 4:
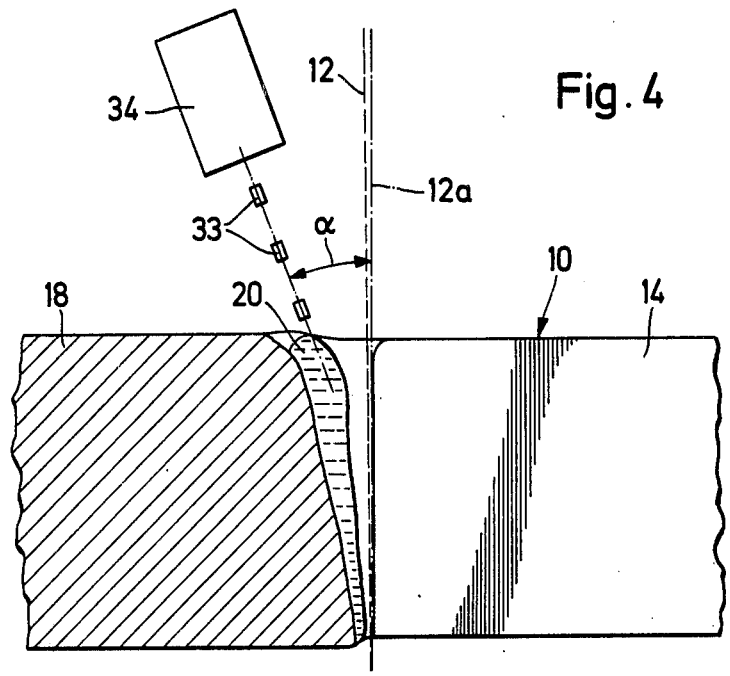
Figure 5:
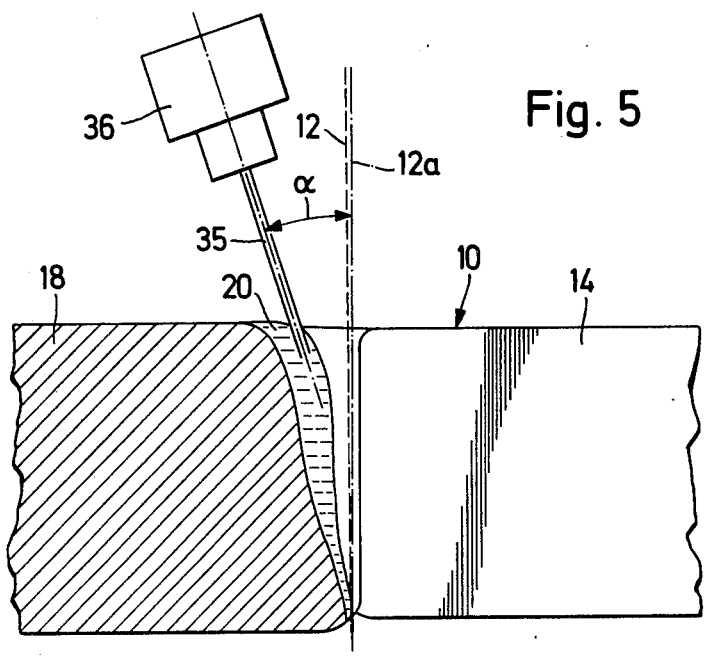

FIG. 4 shows a sectional view in the median plane of a join between two parts being welded together by means of an electron beam welding machine according to the invention, using discontinuously introduced solid additive material; and FIG. 5 shows a sectional view in the median plane of a join between two parts being welded together by means of an electron beam welding machine according to the invention, using liquid additive material.

In FIGS. 1 and 2, it is assumed that two parts 10 of plate-like shape (only one of which is visible in FIGS. 1 and 2) are being welded together by means of an electron beam 12 along a join 14, the median plane of which coincides with the plane of the drawing. The electron beam 12 is generated by a gun 13, pertaining to an electron beam welding machine of known type in principle, not shown in detail. The construction and mode of operation of electron beam welding machines being known, a more detailed representation and description may be dispensed with. During welding, the parts 10 move in the direction of an arrow 16 relative to the beam 12. The electron beam 12 may be moved to and fro across the join 14 in known manner, producing a melt 20 in a welding zone 15, which melt proceeds along the join 14 as the parts move relative to the beam, solidifies behind the beam 12 (at the left of it in FIGS. 1 and 2), and forms a seam 18 filled with solidified material. The high-energy electron beam 12 generally travels in a channel of evaporated material in the welding zone 15.

To fill a gap present at the join and/or for the purpose of incorporating certain alloy or additive elements in the melt at the weld, additive material is required.

Such additive material may be fed into the welding zone 15 in the solid state, preferably in the form of rod, wire or ribbon, for example as wire 24 (in FIGS. 1 and 2), continuously by a feeding means 25. The feeding means may for example be designed as described in U.S. Pat. No. 3,165,619 (corresponding to German Public Disclosure No. 1,270,708).

Alternatively, however, the additive material may (be supplied) discontinuously in the form of particles 33 (FIG. 4), preferably alike in shape, for example cylindrical, injected into the melt at the weld at constant or variable time intervals by a catapult means 34 operating on well-known mechanical principles (for example utilizing the energy stored in a spring).

Finally, the additive material may instead be injected into the melt at the weld in liquid form as a jet 35 (FIG. 5) of fused material emitted at very high velocity from a heated nozzle 36.

Heretofore, additive material has been supplied only in solid form and continuously, so that the electron beam 12 would impinge upon and fuse it at or in front of the surface of the parts 10, and then the fused additive material would flow or drip into the welding zone and unite with the melt 20. In the case of heavier parts, such supply of additive material will not ensure thorough blending with the fused material of the work and filling of deeper regions of the join.

According to the invention, therefore, measures are adopted to bring the additive material rapidly beneath the surface of the melt in the welding zone. In the case of continuously introduced solid additive material, preferably in the form of wire or ribbon, this is accomplished, as may be seen particularly in FIG. 2, by feeding the additive material, as yet in the solid state, at an acute angle $\alpha$ to a beam axis 12a, so that it will enter, still in the solid state, into the melt 20, and arrive at the beam axis 12a in the solid state, if at all, only at a point 26 located at some depth S beneath the surface of the parts of the work facing the gun. The depth S is preferably at least an eighth of the thickness D of the parts 10. This orientation of the supply of additive material is appropriately retained also for discontinuous introduction of solid additive material as well as for introduction of liquid additive material.

Quite in general, the additive material is preferably introduced at that point in the melt where, owing to the energy distribution in the welding zone and the welding speed (velocity of advance in the direction of the arrow 16 relative to the beam), the thickness of the melt is greatest.

In the case of continuously introduced solid additive material, it may be expedient, particularly if considerable quantities of additive material must be supplied per unit time in order to fill the gap 14, to preheat the additive material, preferably present in rod, wire or ribbon form, before introducing it into the melt. This may be done in various ways, for example by direct passage of current as schematically indicated in FIG. 1 by a variable source of current 28 connected between the supply means 25 and the parts 10 of the work. Another possibility consists in briefly deflecting the electron beam 12 with a deflection means 30 of known type so that it impinges on the body of filling material 24 and heats it, but without melting it.

In the method according to the invention, the tip of the continuously introduced solid additive material may not reach the beam 12 until for example halfway through the depth of the seam. The additive material is fused in substantial portion, for example more than 50%, in the melt 20 by transfer of heat from the melt, and only in a lesser portion or not at all by direct action of the electron beam 12.

It is also seen in FIGS. 1 and 2 that a tack weld 32 temporarily connecting the two parts of the work cannot interfere with the welding operation, since the tack weld will already have been fused by the beam 12 when that point along the join reaches the zone of supply of the filling material.

FIG. 3 shows the case where a join 14', its longitudinal direction extending vertically, is being welded by means of a horizontal electron beam 12 moving from below upward relative to the parts 10' of the work. In this embodiment of the invention by way of example, wires 24' and 24" of additive material are introduced into the melt 20' as has been explained above from both sides of the work.

We claim:

1. Method of welding a join between two parts by means of an energy beam extending along a beam axis, the energy beam being directed into the join to produce a welding zone containing molten material, and moved along the join relative to the parts of the work, and additive material being introduced in the welding zone continuously or discontinuously to fill a gap present at the join and/or influence the welding zone metallurgically, characterized in that the additive material is introduced into the melt at an acute angle to and at a point which is spaced alongside the central beam axis whereby said additive material penetrates deeply into said molten material.

2. Method according to claim 1, characterized in that an electron beam is used as energy beam.

3. Method according to claim 1, characterized in that the angle between the direction of supply of the additive material and the beam axis is at most 30°.

4. Method according to claim 1, characterized in that the angle between the direction of supply of the additive material and the beam axis is at most 25°.

5. Method according to claim 1, characterized in that the angle between the direction of supply of the additive material and the beam axis is at most 20°.

6. Method according to claim 1, characterized in that the beam axis and the direction in which the additive material is introduced into the melt intersect at a point whose distance S from a surface of the parts of the work facing a beam gun is between one-eighth and two-thirds of the thickness D of the work.

7. Method according to claim 1, characterized in that the additive material is continuously introduced in solid form into the molten material in the welding zone.

8. Method according to claim 1, characterized in that the additive material is discontinuously introduced in solid form into the molten material in the welding zone.

9. Method according to claim 1, characterized in that the additive material is introduced in liquid form, as a jet of molten material, into the molten material in the welding zone.

10. Method according to claim 1, characterized in that the rate of supply of additive material continuously or discontinuously introduced is so controlled that said material in a completely fused state will not unite with the fused material of the weld until one-eighth to one-half of the way through the total depth of said fused material.

11. Method according to claim 1, characterized in that additive material continuously introduced in solid form into the molten material in the welding zone is preheated by means of an additional energy source to a temperature below its melting temperature.

12. Method according to claim 1, characterized in that additive material continuously introduced in solid form into the molten material in the welding zone is preheated by the energy beam, periodically deflected briefly from its welding position, to a temperature below its melting temperature before it reaches the molten material.

13. Method according to claim 1, wherein said point at which additive material is introduced is spaced from said central beam axis in the direction on said parts which is opposite to the direction of said relative motion of said beam.

* * * * *